Patented Sept. 1, 1925.

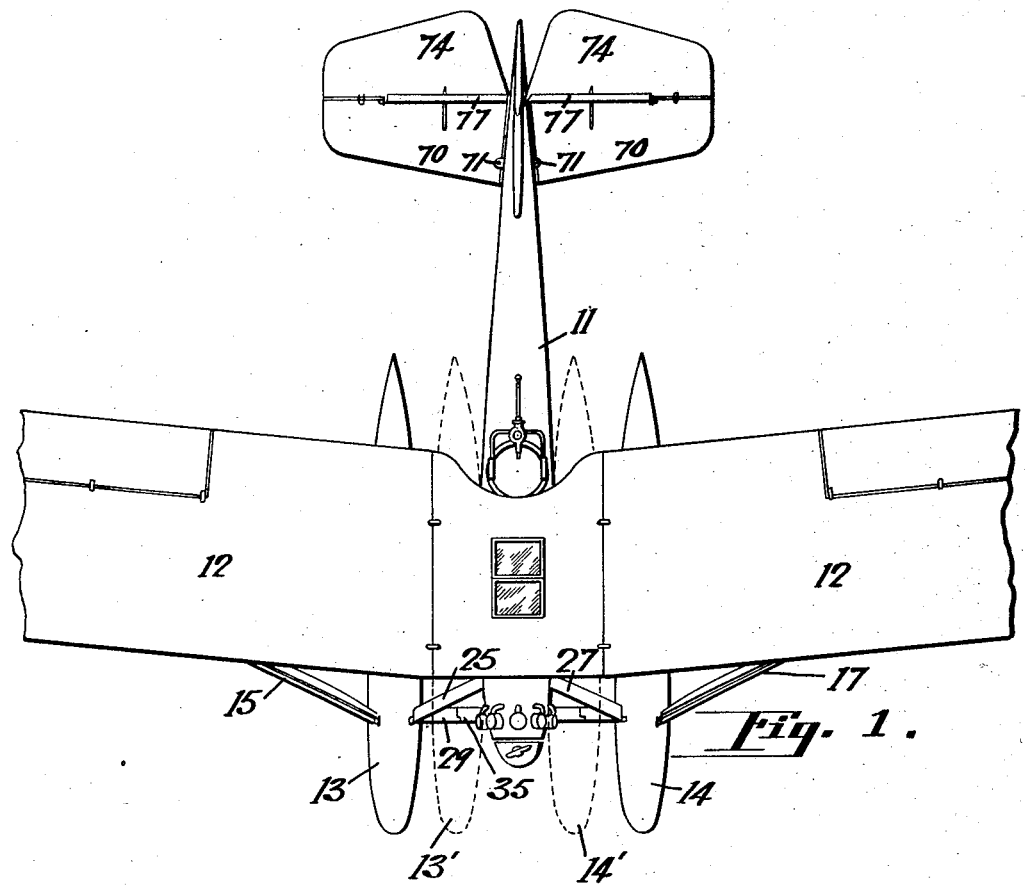
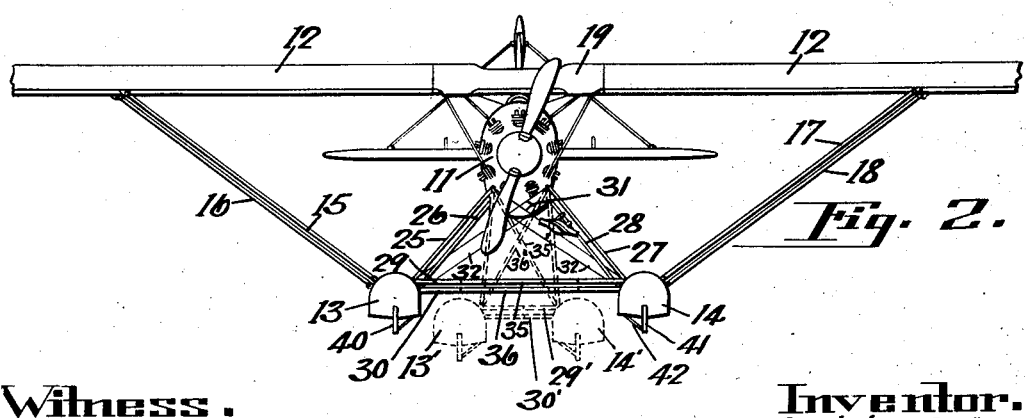

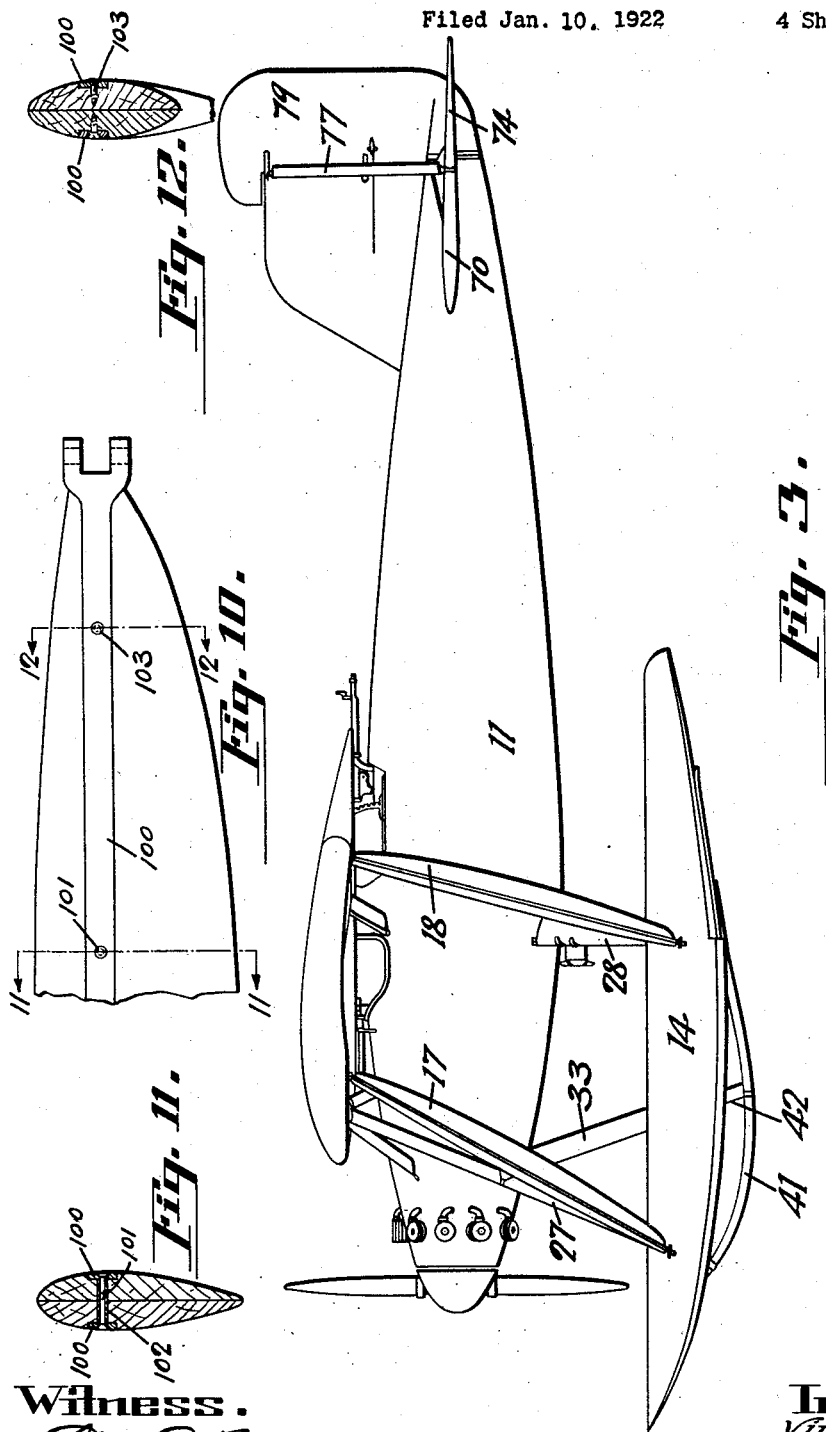

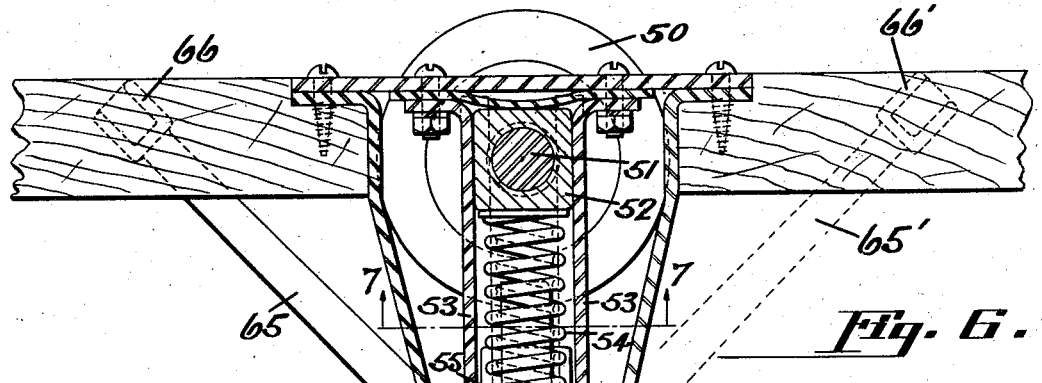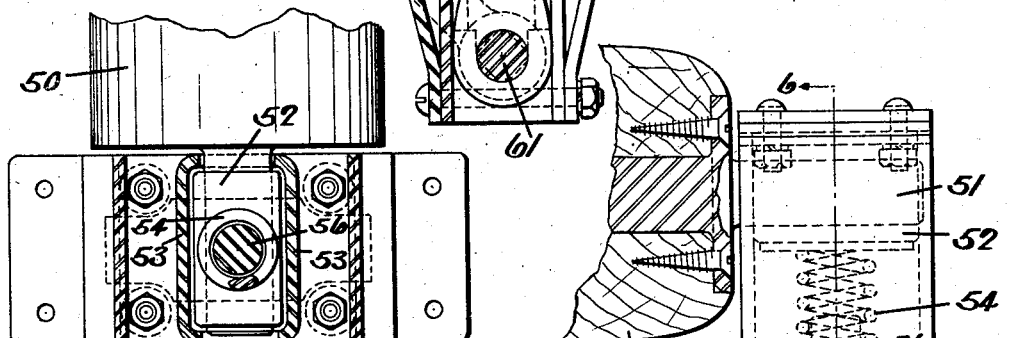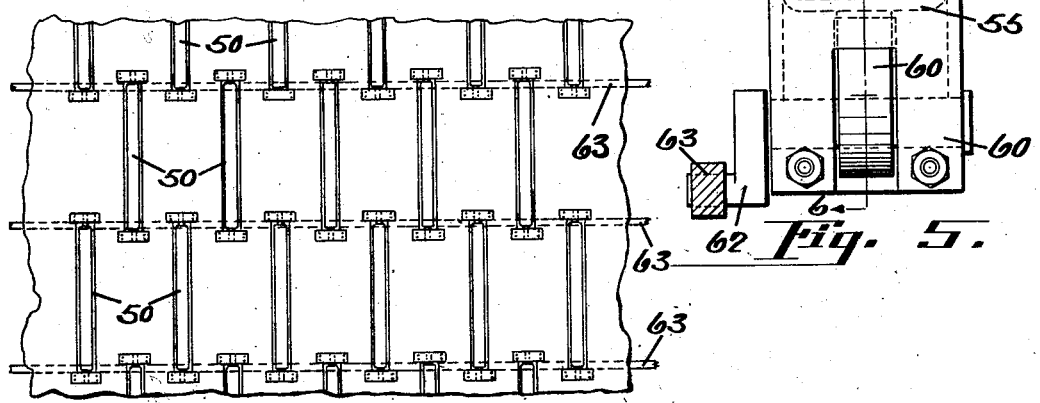

1,552,111

UNITED STATES PATENT OFFICE.

VIRGINIUS E. CLARK, LYMAN L. HILL, AND ROBERT E. FLEMING, OF DAYTON, OHIO, ASSIGNORS TO DAYTON-WRIGHT COMPANY, OF DAYTON, OHIO, A CORPORATION OF DELAWARE.

AIRPLANE.

Application filed January 10, 1922. Serial No. 528,251.

*To all whom it may concern:*

Be it known that we, VIRGINIUS E. CLARK, LYMAN L. HILL, and ROBERT E. FLEMING, citizens of the United States of America, residing at Dayton, county of Montgomery, and State of Ohio, have invented certain new and useful Improvements in Airplanes, of which the following is a full, clear, and exact description.

This invention relates to airplanes and landing stages therefor and has particular reference to airplanes which may land on water or on shipboard, and are so constructed as to be quickly disassembled and assembled again without realignment of the wings and tail surfaces.

An object of this invention is to provide an airplane having floats which enable it to alight upon the water and also having landing skids which enable it to alight upon a solid surface, as for instance, the deck of a ship.

Another object is to provide a landing stage, as for instance, on the deck of an airplane carrier, having rotatable means thereon upon which an airplane equipped with landing skids may alight.

Another object is to provide means for extending the above mentioned rotatable means above the surface of the landing stage when desired, or retracting them below the surface when an unobstructed surface is desired.

Another object is to provide an airplane having detachable wings and means for swinging the landing floats close together without disconnecting them from the fuselage when the wings are detached, for the purpose of greatly decreasing the space occupied by the airplane when stored on an airplane carrier ship and still permitting a quick reassembly without necessitating realignment.

Another object is to provide an airplane having flexible control leads leading to control surfaces and means for detaching the control surfaces from the plane without disconnecting the flexible control leads, thereby permitting quick disassembly and reassembly.

Further objects and advantages of the present invention will be apparent from the following description, reference being had to the accompanying drawings, wherein preferred forms of embodiments of the present invention are clearly shown.

In the drawings:

Fig. 1 is a plan view of an airplane embodying my invention and showing the disassembled position of the floats in dotted lines.

Fig. 2 is a front elevation also showing the disassembled position of the floats in dotted lines.

Fig. 3 is a side elevation of the plane showing the yieldable landing skid attached to the bottom of the landing float.

Fig. 4 is a plan view of a landing stage for airplanes equipped with landing skids and is especially adapted for use on shipboard.

Fig. 5 is a detail view showing the yieldable support for the rollers and means for raising or lowering the rollers relative to the landing surface.

Fig. 6 is a section on line 6—6 of Fig. 5 but showing a modified form of the means for raising or lowering the rollers.

Fig. 7 is a section on line 7—7 of Fig. 6.

Fig. 10 is a detail view showing the construction of a reinforced wooden strut which may be used for the long wing struts.

Fig. 11 is a section on line 11—11 of Fig. 10.

Fig. 12 is a section on line 12—12 of Fig. 10.

In the drawings similar reference characters refer to similar parts throughout the several views.

Figure 8:
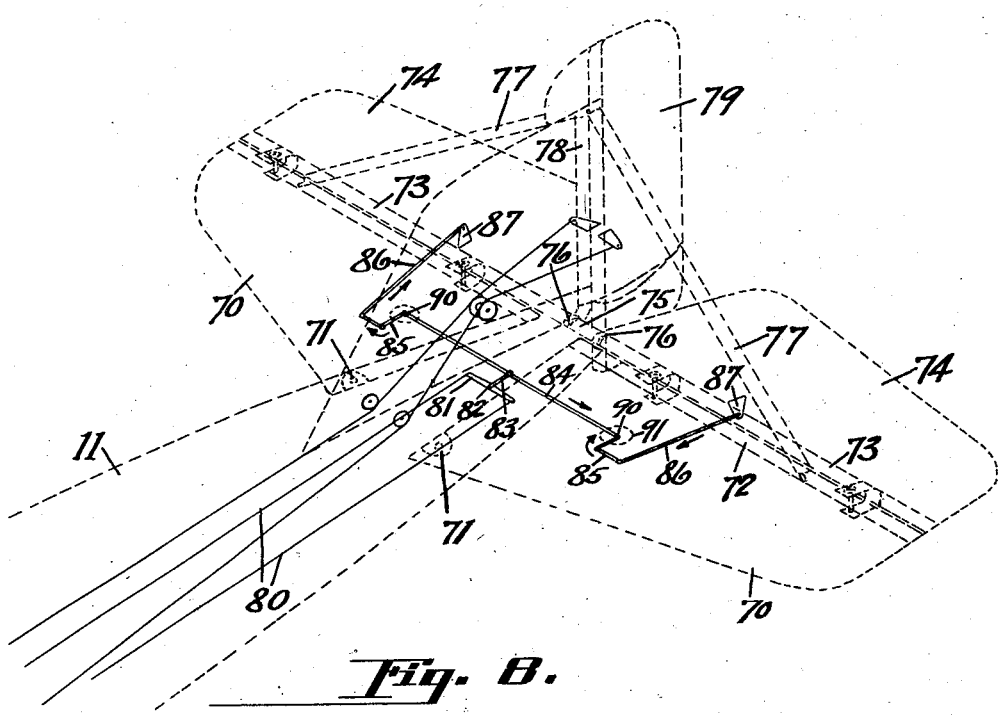
Fig. 8 is a diagrammatic view showing the means for detaching the horizontal stabilizer and elevators from the fuselage without detaching the flexible elevator control cables.

The numeral 11 designates the fuselage of the airplane which has the wings 12 and the landing floats 13 and 14. The wings 12 are pinned to the center section 19 and are supported from the floats 13 and 14 by the rigid strut members 15 and 17 at the front and 16 and 18 at the rear. In detaching the wings it is necessary therefore simply to pull a pin from each of the center section attachment fittings, and from the lower ends of the four outboard struts 15, 16, 17 and 18 (which are hinged at their upper ends), and from the connections of the aileron actuating rods (not shown) at the edge of the center section.

The floats 13 and 14 are supported from the fuselage 11 by the front struts 25 and 27, the brace struts 33 (see Fig. 3), and the rear struts 26 and 28 together with the front and rear cross bars 29 and 30. The diagonal brace wires 31 and 32 (see Fig. 2) are necessary to take any unequal lift on the opposite wings as well as any unequal upward force on the floats in landing. The cross bars 29 and 30 have removable middle sections 35 and 36 so that when the wing struts 15, 16, 17, and 18 have been detached from the floats, the floats may be swung in under the fuselage to the dotted positions shown in Figs. 1 and 2 and fastened in this retracted position by pinning together the projecting ends of the cross bars 29 and 30. The removable middle sections 35 and 36 preferably are used as diagonal braces for the retracted position of the floats by pinning them in fittings provided for this purpose (see Fig. 2). Thus it is seen that after the wings are removed the floats may be swung to the retracted position without detaching any of the struts or brace wires with which they are fastened to the fuselage. Hence when the plane is reassembled no realignment is required, it being necessary only to remove the sections 35 and 36 from their diagonal brace positions shown at 35' and 36' in Fig. 2, and replace them in their normal positions as shown in full in Fig. 2.

The wing struts 15, 16, 17, and 18, being of unusual length, are preferably constructed according to the design shown in Figs. 10, 11 and 12. The metal strips 100, preferably of steel, are securely fastened to the flat sides of the wooden struts to stiffen and strengthen them against lateral buckling. Since the moment of inertia of a streamlined strut section about its short axis is very much greater than its moment of inertia about its long axis it is necessary to increase the strength of the strut, only against lateral buckling in order to greatly increase the compressive load which the strut can safely carry. The reinforcing strips 100 may be fastened to the strut by means of rivets 101 which extend through the strut and through spacer tubes 102 between the strips 100 (see Fig. 11). If desired the strips 100 may be fastened to the strut by wood screws 103 as shown in Fig. 12. Preferably however both rivets and screws are used and alternately spaced. The form of strut illustrated in Figs. 11 and 12 is made up of two component sections and the sections securely fastened together with waterproof glue and with the metal strips 100. The reinforcing strips preferably extend over the tapered ends of the strut and are suitably joined to the end fittings, as by welding or riveting.

The airplane is provided with landing skids 40 and 41 beneath the floats 13 and 14, properly reinforced and braced so that the landing stresses are transmitted directly from the skid and keel up through the fuselage struts and wing struts. This is accomplished by a carry-through brace within the float from the wing strut fittings and from the fuselage strut fittings to the float keel to take the concentrated landing loads. However since the cross bars 29 and 30 must be above the water line an unavoidable eccentricity at the float connections occurs, but is taken care of by rigidly connecting the cross bars 29 and 30 with the floats so that they take all the eccentric moment, the other strut connections to the float being pin joints to avoid bending in those struts. The skids 40 and 41 are preferably made of tough resilient wood, such as hickory, in order to take an appreciable amount of the shock in landing. These skids preferably have a slidable connection to the pontoon at the rear and are braced laterally by the short brace members 42 which are pinned so as to swing with the skid when it is deflected by the shock of landing.

The above described airplane is adapted to alight on an airplane carrier ship equipped with a landing stage having a large number of rollers 50 suitably mounted and spaced thereon (see Fig. 4). In landing, the airplane skids roll along the deck upon these rollers until the plane is brought to a stop by a reversible propeller or other braking means. Due to the fact that the plane is passing rapidly over the rollers when it first strikes the landing stage the full rebound of the rollers will not be effective against the plane since they will slide off at the rear of the skid before they have time to fully rebound.

Preferably these rollers 50 have yieldable bearings in order to act as a shock absorber. In the form of shock absorber bearings illustrated in Figs. 5, 6 and 7 the roller journal 51 has a bearing in a block 52 of lignum vitæ which rides up and down in the guides 53. A compression spring 54 for absorbing the landing shock bears against the under side of the block 52 and is supported at the bottom by a plate 55 likewise guided by the guides 53. The spring 54 is held centered upon the plate 55 by the lug 56 attached to plate 55. Provision has also been made for dropping the rollers below the deck so that if desired, an unobstructed deck may be had for airplanes equipped with ordinary rubber tired wheels. In Fig. 5 a cam 60 keyed to the shaft 61 mounted in the lower part of the guide frame 53 is adapted to ride against the under side of the plate 55. The shaft 61 is rotated by a short crank 62 which is operated by the rod 63. These rods 63 may extend the whole length of a row of rollers and operate all the cams 60 along that row simultaneously as shown more or less diagrammatically in Fig. 4. This will enable all the rollers to be raised or lowered in a very short time. Or, if desired, each of the cams 60 may be individually operated as in the modification illustrated in Fig. 6. The crank arm 65 attached to shaft 61 has its upper end just below the surface of the landing deck on one side when the rollers 50 are in their raised position (as shown in full lines in Fig. 6), and just below the surface on the opposite side when the rollers are in their lowered position (as shown in dotted lines in Fig. 6). The upper end of the cranks 65 may be provided with a socket 66 to receive a removable operating handle by which the cranks 65 may be more easily thrown from one position to the other.

We do not wish to be limited in any way to the particular form of rollers, shock absorbing means, or roller raising and lowering means herein shown and described, as it is obvious that the scope of our invention includes any kind of rotatable means suitably mounted upon the landing deck of an airplane carrier which will enable an airplane not equipped with landing wheels to land thereon. Since planes which are flown from ships at sea must have some provision for emergency landings on the water, landings on the deck of an airplane carrier can be more efficiently taken care of by applying the necessary attachments to the deck itself rather than to the airplane where they would add weight, head resistance and much complication.

The method of quickly taking down the wings and retracting the floats or reassembling the same without the necessity of realignment has been described herein. In the storage of airplanes on board ship great economy of storage space may also be obtained by detaching the horizontal tail surfaces from the fuselage. However, if it is necessary to disconnect the flexible control cables leading to the tail control surfaces the above mentioned advantage is offset by the difficulty of again connecting the control cables and the necessity of readjusting their tension. This invention therefore includes provisions for quickly detaching the horizontal tail surfaces from the fuselage without disconnecting or interfering with the adjustment of the control cables.

Figure 9:
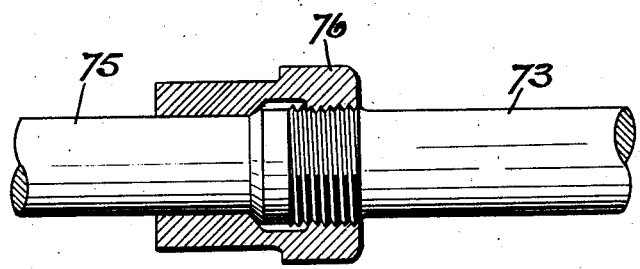
Fig. 9 is a detail view showing one method of attaching the elevator spar to the fuselage.

The horizontal stabilizers 70 have their front spars pinned to the side of the fuselage 11 at the fittings 71 (see Fig. 8). The rear spars 72 of the stabilizers are hinged to the torque tubes 73 of the elevators 74. The torque tubes 73 are rigidly connected by means of the collars 76 as shown in detail in Fig. 9 to the short tube 75 which is rotatably mounted in the fuselage 11. Brace struts 77 extend from the rear stabilizer spars 72 to the vertical standard 78 to which the rudder 79 is hinged. The elevator control cables 80 are fastened to the ends of the rocker bar 81 which is pivoted at 82. Rocker bar 81 has an arm 83 projecting rearwardly therefrom and pivoted at the end of arm 83 is the reciprocating rod 84. Rod 84 extends interiorly of the stabilizers 70 and operates the bell crank levers 85 which are pivoted to the stabilizers. The other arm of the bell cranks 85 is connected to the elevator horns 87 through the links 86. The horn 87 on the right elevator extends downward as shown in Fig. 8 so that both elevators are raised or lowered together as rod 84 is reciprocated. When it is desired to remove the stabilizers and elevators the controls are first disconnected by removing pins 90 connecting rod 84 to the bell cranks 85, gaining access thereto through hand holes 91. The collars 76 are turned to release the threaded ends of torque tubes 73 and the pins withdrawn from the fittings 71 and from the top fittings of struts 77, after which the stabilizer, elevator, strut 77 and connections 85, 86 and 87 on each side may be withdrawn as a unit. For quick assembly reverse operation is required and this may be quickly accomplished since no realignment is necessary. To connect up the control connections it is necessary only to reinsert the pins 90, no further adjustment being required since the cables 80 remain connected to the rocker bar 81 and are not loosened in any way when the elevators are detached.

While the forms of mechanism herein shown and described, constitute preferred forms of embodiments of the present invention, it is to be understood that other forms might be adopted, all coming within the scope of the claims which follow.

What we claim is as follows:

1. An airplane having a plurality of landing pontoons for alighting upon water, said pontoons having bowed flexible skids attached directly to the keel of said pontoons whereby the airplane may alight upon a solid surface.

2. An airplane having a plurality of landing pontoons for alighting upon water, said pontoons having yieldable skids attached directly to the keel of said pontoons whereby the airplane may alight upon a solid surface.

3. An airplane having two laterally spaced landing floats, brace means for rigidly supporting said floats in their normal laterally extended position, means for disconnecting certain of said brace means to permit said floats to swing closer together, and brace means for rigidly supporting said floats in their contracted position.

4. An aircraft having two laterally spaced landing floats rigidly supported thereupon for supporting the weight of the aircraft, means to permit the swinging of the floats to decrease their lateral spacing, and means to hold them rigidly in their contracted position when the wings of the aircraft are detached, whereby the aircraft will occupy a smaller storing space.

5. In an airplane having detachable wings, in combination, two laterally spaced floats normally held rigidly extended, detachable means for permitting said floats to swing inwardly to materially decrease the lateral spacing thereof when the wings have been detached, and means for rigidly fixing said floats in their inner position in such a way that they will sustain the weight of the airplane and yet occupy a greatly decreased space when stored.

6. In an airplane having a fuselage and detachable wings, in combination, two laterally spaced floats, pivoted struts interconnecting said floats and fuselage, spacing struts for holding said floats in normal position, said spacing struts being removable whereby said floats are permitted to swing inwardly on said pivoted struts to materially decrease the lateral spacing thereof, and means for rigidly fixing said floats in their inner position in such a way that they will sustain the weight of the airplane when stored.

7. In an airplane having a fuselage and detachable wings, in combination, two laterally spaced floats, pivoted struts and diagonal tie members interconnecting said floats and fuselage, spacing struts for holding said floats in normal position, said spacing struts being removable whereby said floats are permitted to swing inwardly on said pivoted struts to materially decrease the lateral spacing thereof, without affecting the adjustment of said diagonal tie members.

In testimony whereof we hereto affix our signatures.

V. E. CLARK.
LYMAN L. HILL.
ROBERT E. FLEMING.